United States Patent [19]

Cox

[11] Patent Number: 4,512,588

[45] Date of Patent: Apr. 23, 1985

[54] STAIR CLIMBING WHEEL CHAIR

[76] Inventor: Kenneth R. Cox, 2711 Marquis Cir. E., Arlington, Tex. 76016

[21] Appl. No.: 485,269

[22] Filed: Apr. 15, 1983

[51] Int. Cl.$^3$ .......... B62B 5/02

[52] U.S. Cl. .......... 280/5.26; 180/8.2; 280/DIG. 10

[58] Field of Search .......... 280/5.26, 5.24, DIG. 10; 180/8.2, 907

[56] References Cited

U.S. PATENT DOCUMENTS

| | | | |
|---|---|---|---|
| 3,178,193 | 4/1965 | Grogan | 280/5.26 |
| 4,421,189 | 12/1983 | Watkins et al. | 280/DIG. 10 |

FOREIGN PATENT DOCUMENTS

| | | | |
|---|---|---|---|
| 1471296 | 1/1967 | France | 280/5.26 |
| 1117175 | 6/1968 | United Kingdom | 280/5.26 |

OTHER PUBLICATIONS

Wanted—A Stair-Climbing Wheel Chair, U.S. Dept. of Commerce, 1/1962, pp. 27–37.

*Primary Examiner*—John A. Pekar

[57] ABSTRACT

A self propelled wheel chair is adaptable to climbing and descending stairs and steep slopes. The wheel chair is foldable for transporting and storing. Operation on level ground is similar to the operation of a conventional wheel chair. The wheel chair is supported by caster wheels on the front corners and by spider wheels on the rear corners. Skids are mounted to the caster forks for stabilizing the front of the chair during climbing operations. The casters are mounted to parallelogram linkages on the front of the wheel chair. The parallelogram linkages move the casters down and forward for repositioning to the climbing mode. The spider wheels are rotatably mounted to four bar linkages on the wheel chair side frames. The spider wheels engage the stairs to propel and stabilize the wheel chair during climbing or descending of stairs. The four bar linkages sequence the repositioning of the spider wheels and casters for climbing. Weight is shifted to the spider wheels for climbing so that they can provide climbing forces without slipping. Propulsion and transition control and power are provided by individual hand wheels linked by chain drives to the spider wheels and transition linkages. Propulsion power for both conventional level operation and stair climbing operation is transmitted through the same hand wheels and spider wheels. The hand wheels are grounded to the wheel chair structure by no back brakes to brake the wheel chair linkages and spider wheels in place when the hand wheels are released by the passenger.

11 Claims, 26 Drawing Figures

STAIR CLIMBING WHEEL CHAIR

FIELD OF INVENTION

This invention relates to an improved occupant powered and controlled vehicle which is adaptable to climbing steps or stairs, as well as traversing surfaces with modest or steep slopes. More particularly, it relates to vehicles of this type which are constructed to serve as invalid wheel chairs.

DISCUSSION OF PRIOR ART

Heretofore, invalid wheel chairs have been restricted to level surfaces, modest sloped ramps, elevators or negotiation of such surfaces with the assistance of attendants. Many vehicles have been proposed, but all have certain diadvantages which my invention is intended to overcome. One class of such vehicles employs tracks for climbing and separate large diameter wheels for propulsion on level surfaces. This class of vehicles is penalized by the additional weight and size required for two independent propulsion systems. A second class of vehicles employs spider like wheels which engage steps. One such vehicle is U.S. Pat. No. 2,931,449 patented by C. A. King. The King patent requires passenger sequencing of two means of driving the spider wheels and a seat leveling drive system as it climbs each step. The three drive systems required by the King invention makes it difficult to design as a lightweight occupant powered folding wheel chair.

OBJECTS

Accordingly, a first object of my invention is to provide a wheel chair suitable for negotiating steps and slopes without the assistance of an attendant.

A further object of the invention is to provide a wheel chair as described which is automatically adaptable to the negotiation of stairs and slopes of varying dimensions.

A further still object of the invention is to provide a wheel chair as described which automatically maintains the occupant seat substantially level during climbing from one step to the next step.

A further object of the invention is to provide a wheel chair as described which is occupant powered and controlled in a simple and natural manner.

A further object of the invention is to provide a wheel chair as described which receives all propulsion inputs in the same device without passenger sequencing while climbing from step to step.

A still further object is to provide a wheel chair as described which will traverse in a conventional manner on smooth level surfaces, pass through normal doors and turn around in narrow hallways.

A further still object is to provide a wheel chair as described which is lightweight, foldable and transportable.

A still further object is to provide a wheel chair as described which operates with a minimum loss of mechanical power in the propulsion and transition drive systems and in the vehicle interface with obstacle surfaces.

A further object is to provide a wheel chair as described which has means to prevent back driving of propulsion and transition power inputs. Such means shall operate automatically without occupant control input to prevent the wheel chair from rolling down stairs or steep slopes.

A still further object is to provide a wheel chair as described which is adaptable to powered operation.

Further objects and advantages of my invention will become apparent from a consideration of the drawinges and ensuing description thereof.

DRAWINGS

DESCRIPTION

Figure 1:
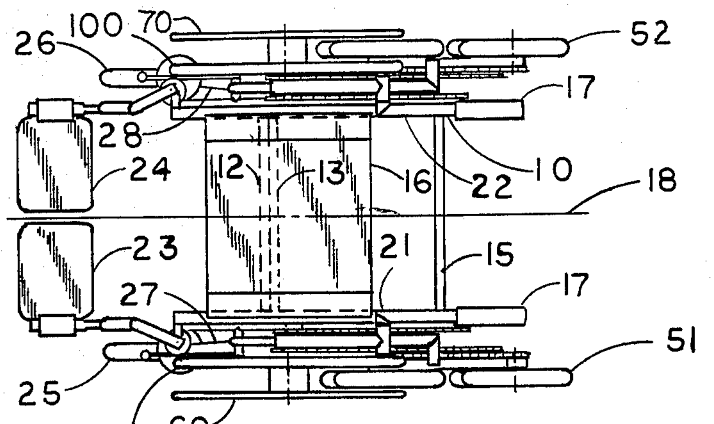
FIG. 1 is a plan view of a wheel chair employing my invention and shown in the conventional operating position.

The embodiment of my invention consists of a seat frame with spider like wheels attached at the rear on each side of the frame and with castering wheels with angled skids attached on each side on the front. The caster wheels and spider wheels are mounted on linkages which allow them to be repositioned for stair climbing. Propulsion power and transition inputs are applied through hand wheels mounted on the transition linkages. Operation and appearance of the embodiment of my invention are similar to those of a conventional wheel chair.

Referring to FIGS. 1,2,3 and 4; the seat frame 10 of my invention has a well known scissor type folding mechanism 11. The seat frame 10 consists of a left side frame 21, a right side frame 22, forward seat cross brace 12, rear seat cross brace 13 and two toggle links 14. Additionally, a flexible seat back 15, a flexible seat bottom 16, hand grips 17, left foot rest 23 and right foot rest 24 are mounted to the seat frame 10.

Figure 5B:
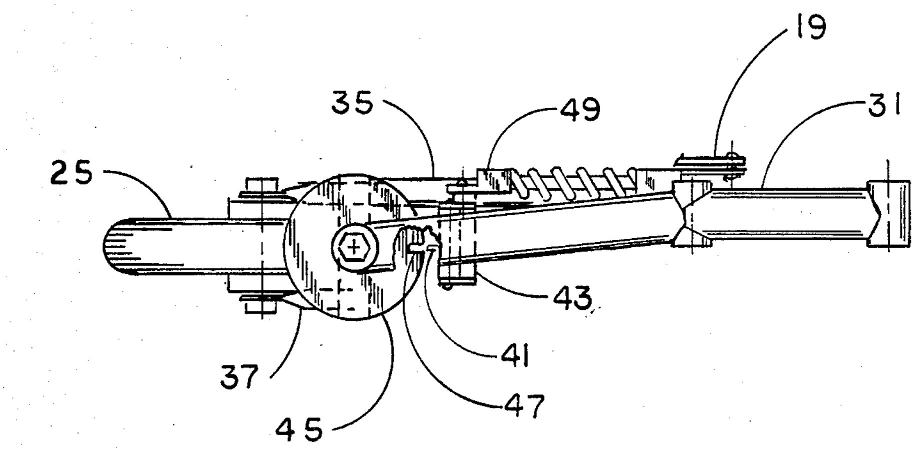
FIG. 5B is a plan view of the left hand caster and its locking mechanism.
Figure 5A:
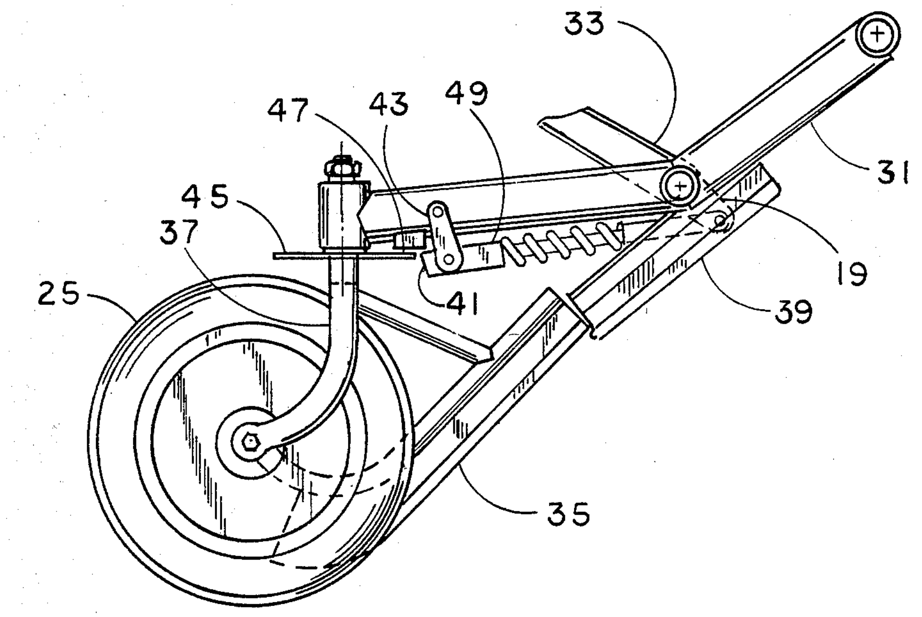
FIG. 5A is a side elevational view of the left hand caster and its locking mechanism.

Since the components which mount to the left side frame 21 and right side frame 22 are constructed and mounted as mirror images of each other with reference to plane 18, only the left side will be described. Corresponding members on the right side will be denoted by the next highest even number. On the left side the caster 25 is mounted to the parallelogram linkage 27. The parallelogram linkage 27 includes an upper link 29, a caster arm 31 and a lower caster link 33. Skid 35 is rigidly attached at an angle to the caster fork 37 as shown in FIG. 5A. An upper skid 39 is rigidly attached to the caster arm 31. The upper link 29 is pivotably mounted to both the side frame 21 and caster arm 31. The lower caster link 33 is also pivotably mounted to both the side frame 21 and the caster arm 31.

Figure 2:
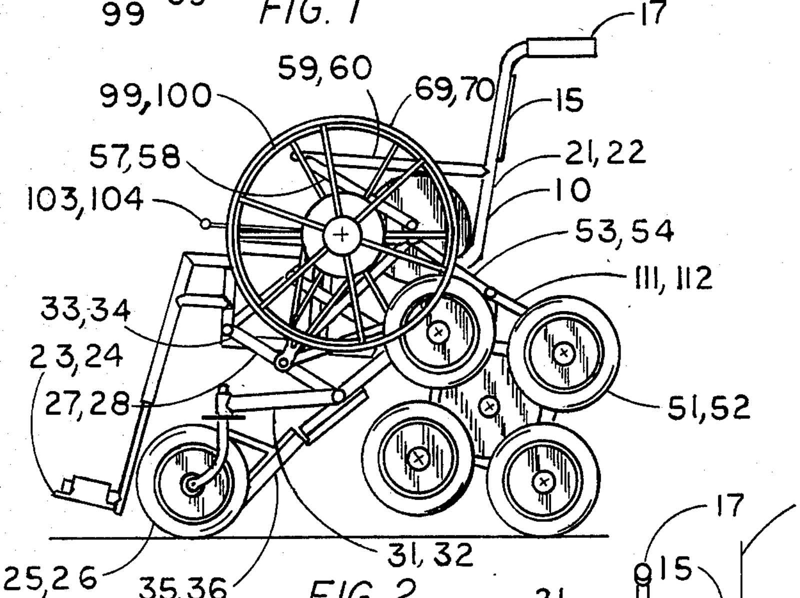
FIG. 2 is a side elevation view of the wheel chair embodiment shown in FIG. 1.
Figure 3:
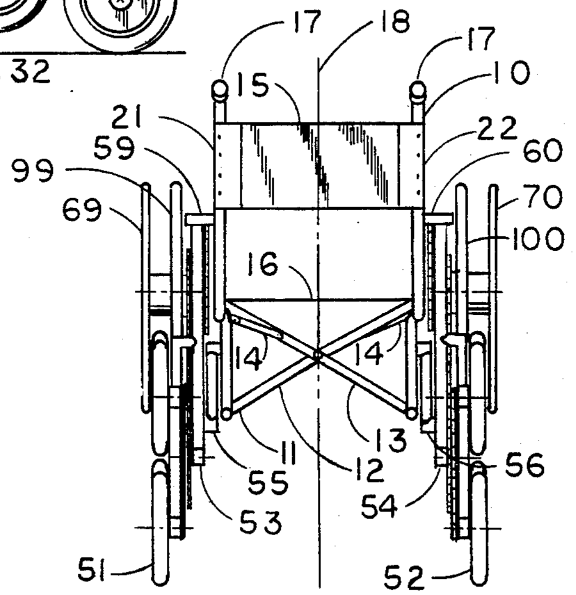
FIG. 3 is a rear elevation view of the wheel chair embodiment shown in FIG. 1.

The caster arm 31 includes a caster lock. Referring to FIG. 5A and FIG. 5B, the lock incorporates a pawl 41 which is mounted to a bellcrank 43. The bellcrank 43 is rotatably attached to the caster arm 31. A slotted disk 45 is rigidly attached to the caster fork 37. The slot 47 on the slotted disk 45 is aligned with the pawl 41 when the caster 25 is in the vehicle backing position as shown in FIG. 2. A compressible link 49 is pivotably attached to the bellcrank 43 and to a lug 19 on the end of lower caster link 33. The compressible link 49, a well known funk spring, is a collapsible link with fixed extended and compressed lengths and is normally held at its extended length by a compression spring.

Figure 4:
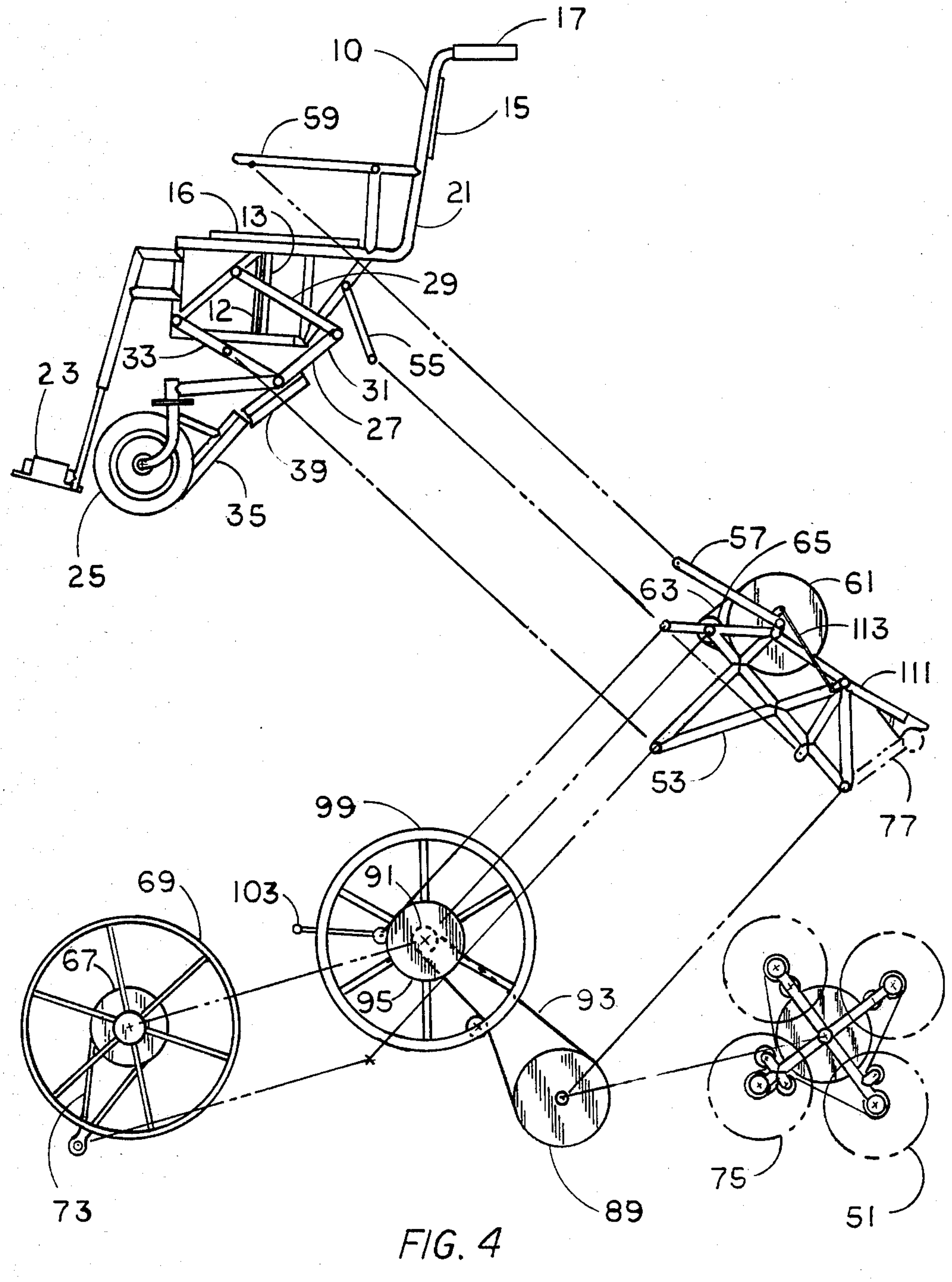
FIG. 4 is an exploded side elevation view of the wheel chair embodiment shown in FIG. 1.
Figure 6:
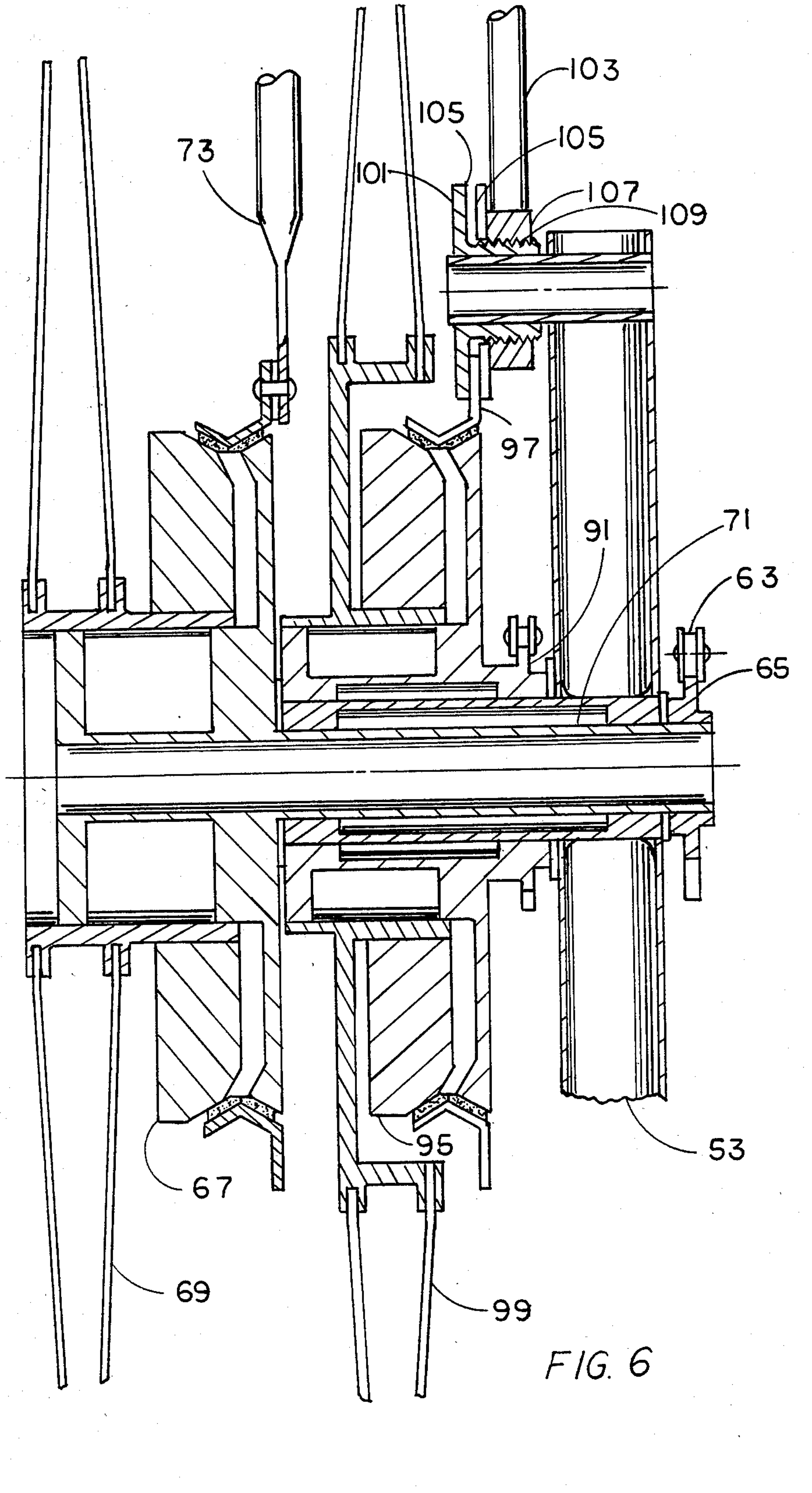
FIG. 6 is a section view cut through the left side hand wheel rotation axis.

Referring to FIG. 4, the spider wheel 51 and drive systems are mounted to a bogie 53 which is suspended from the side frame 21. The forward end of the bogie 53 is pivotably attached to the lower caster link 33. The lower aft end of the bogie 53 is pivotably mounted to the side frame 21 with an idler link 55. The top of the bogie 53 is connected to the side frame 21 with two links in series: a transition arm 57 and an arm rest link 59. The transition arm 57 is rotatably connected to the bogie 53. The arm rest link 59 is pivotably attached to the transition arm 57 and the side frame 21. A large diameter chain sprocket 61 is rigidly attached to the transition arm 57. The sprocket 61 is connected to a small diameter chain sprocket 65 with an endless link chain 63. The small diameter sprocket 65 is rotatably attached to the bogie 53. Referring to FIG. 6, the small diameter sprocket 65 is normally indexed to the bogie 53 by a well known no back brake 67. The transition hand wheel 69, transition no back brake 67 and small diameter sprocket 65 are rotatably mounted about a common axis on the bogie 53. The transition hand wheel 69 is rigidly attached to the input side of the transition no back brake 67. The small diameter sprocket 65 is torsionally connected to the output side of the transition no back brake 67 by transition drive shaft 71. The transition no back brake 67 is indexed to the bogie 53 by the truss 73. The truss 73 is rigidly connected to the bogie 53, as shown in FIG. 4, and to the transition no back brake 67.

Figure 7B:
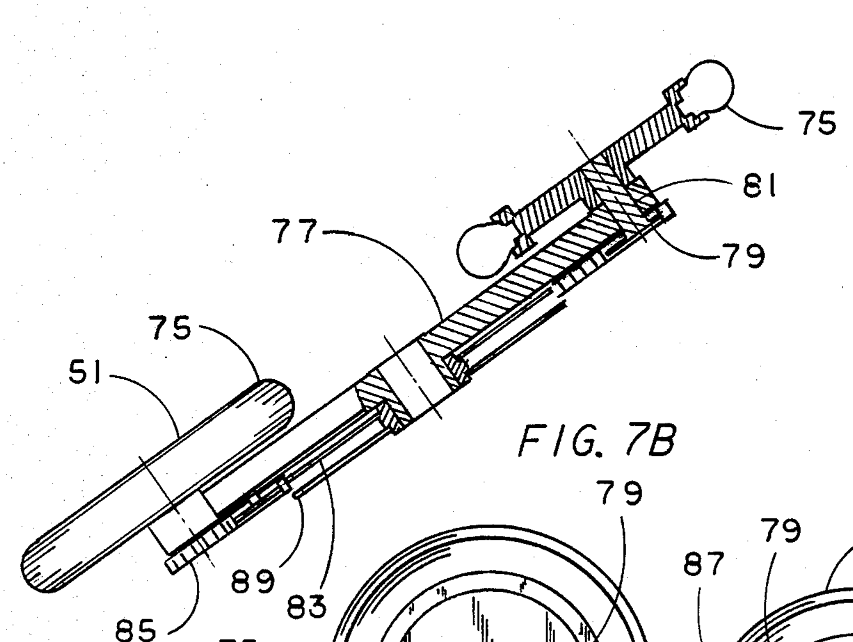
FIG. 7B is a cross section view cut through the spider wheel rotation axis.
Figure 7A:
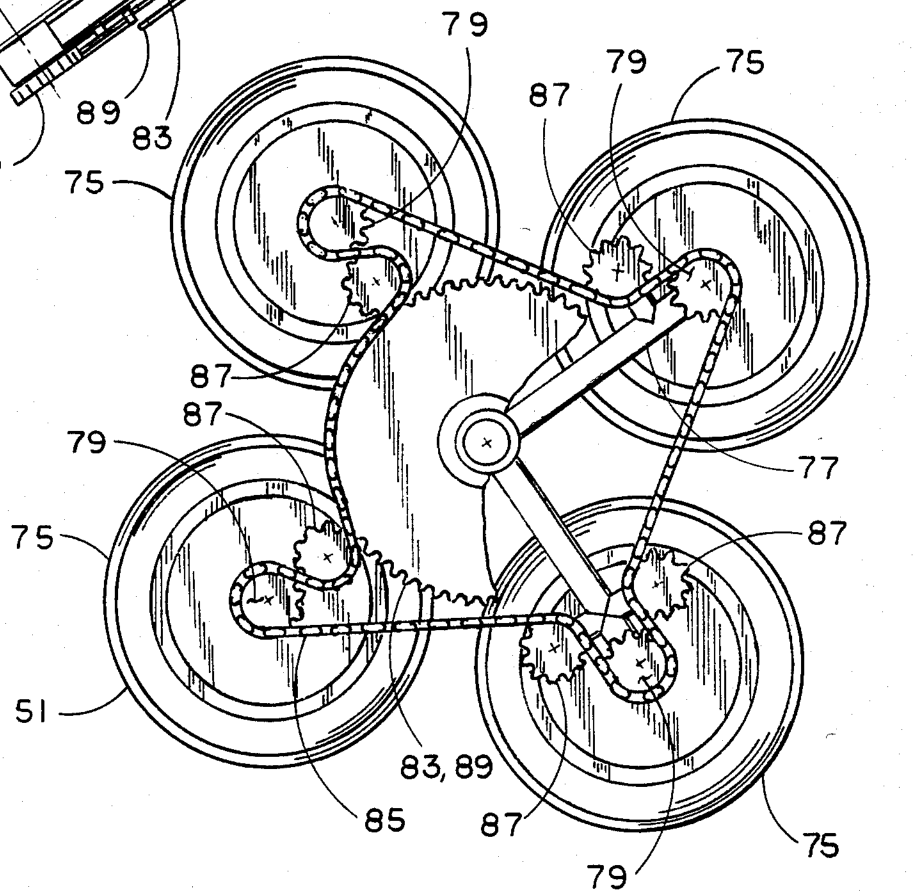
FIG. 7A is a detail side elevation view of the spider wheel.

Referring to FIG. 7A and 7B, the spider wheel 51 includes four minor wheels 75 rotatably mounted to the spider wheel frame 77. A small diameter chain sprocket 79 is torsionally connected to each minor wheel 75 by a minor wheel axle 81. The four sprockets 79 are mechanically coupled to each other and to a large diameter sprocket 83 by an endless link chain 85. Five sprocket idlers 87 are rotatably mounted to the spider wheel frame 77 to provide suitable routing for the endless link chain 85. The large diameter sprocket 83 is coaxially and rotatably mounted to the spider wheel 51. The large diameter sprocket 83 is rigidly attached to a second large diameter sprocket 89. Referring to FIG. 4, the large diameter sprocket 89 is coupled to a small diameter sprocket 91 by an endless link chain 93. The small diameter sprocket 91 is rotatably attached to the bogie 53. The small diameter sprocket 91 is rigidly attached to the output side of the propulsion no back brake 95 as shown in FIG. 6. A disk 97 is rigidly attached to the outer diameter of the propulsion no back brake 95. The propulsion hand wheel 99, propulsion no back brake 95, and small diameter sprocket 91 are all coaxially and rotatably mounted to the bogie 53. A screw actuated caliper brake 101 is attached to the bogie 53 with friction surfaces 105 engaging each side of the disk 97. A brake handle 103 is attached to the caliper nut 107. The caliper nut 107 is threaded on to caliper screw 109 which is rigidly attached to the bogie 53. Referring to FIG. 4, a rachet pawl 111 is configured to engage the spider wheel frame 77. A tension spring link 113 is pivotably attached to the transition arm 57 and the rachet pawl 111. The tension spring link 113 consists of a conventional tension spring surrounded by a hollow tube.

OPERATION

Normal level operation is similar to that of a conventional wheel chair. The front caster wheels 25 and 26 caster to accommodate directional changes. Manual hand power is applied to the propulsion hand wheels 99 and 100 to propel the wheel chair. Steering is accomplished by stalling one side and propelling the other. The spider wheels 51 and 52 are restrained with the forward minor wheels 75 and 76 lifted off the ground by the ratchet pawls 111 and 112 to prevent the minor wheels 75 and 76 from scrubbing while turning during conventional operation.

Folding for transporting or storing is accomplished in the same manner as for a conventional wheel chair. The passenger dismounts and the side frames 21 and 22 are pushed together, collapsing the seat frame scissor folding mechanism 11.

Figure 8A:
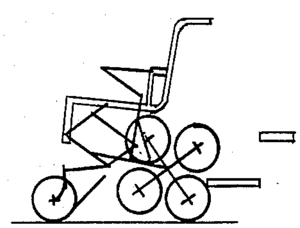
FIG. 8A through FIG. 8K is a series of schematic side elevation views illustrating the manner in which the embodiment negotiates a stairway.

The wheel chair passenger faces down the stairs during both climbing and descending operations. To climb stairs, the wheel chair is backed up to the stairs until the minor wheels 75 and 76 are stalled against the first step as shown in FIG. 8A. Since the operation of both sides of the wheel chair are similar, only the left side will be described. The passenger engages the propulsion no back brake 95 by pushing down on the brake handle 103 until the caliper brake 101 grasp the disk 97, as shown in FIG. 6, to index the propulsion no back brake 95 to the bogie frame 53. The propulsion no back brake 95 prevents the weight of the passenger and wheel chair from back driving the wheel chair when climbing stairs or over running when descending stairs. Torsion applied to the output side of the propulsion no back brake 95 is grounded to the bogie 53 unless an opposing torque is applied to the input side of the propulsion no back brake 95 by the passenger through the propulsion hand wheel 99. Torsion applied to the input side of the propulsion no back brake 95 by the passenger releases the propulsion no back brake 95 and is then transferred to the output side of it. The propulsion no back brake 95 is automatically reset when the propulsion hand wheel 99 is released.

Figure 8B:
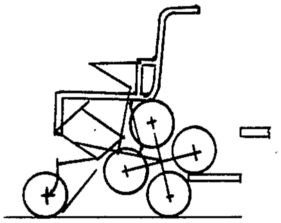

After manually engaging the propulsion no back brake 95, the passenger continues rotating the propulsion hand wheel 99 to begin climbing. The spider wheel 51 begins to rotate about the stalled supporting minor wheel 75 and continues until a second minor wheel 75 contacts the top of the first step as shown in FIG. 8B.

Figure 8C:
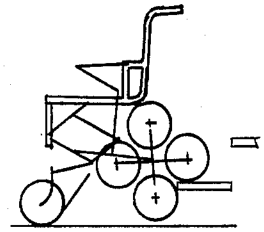
Figure 8D:
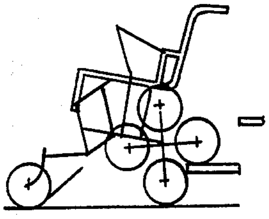

Additional rotation of the spider wheel 51 lifts the forward minor wheel 75 off the ground as shown in FIG. 8C. The passenger seat frame 10 is tilted forward as the spider wheel 51 climbs. Before the seat tilting reaches an uncomfortable level, the passenger must stop climbing and begin repositioning the wheel chair to the climbing position. The passenger rotates the transition hand wheel 69 to drive the transition arm 57 to reposition the bogie 53 and parallelogram caster linkage 27 as shown in FIG. 8D. The transition arm 57 is grounded to the bogie 53 by the transition no back brake 67. Torsion applied to the input side of the transition no back brake 67 by the transition hand wheel 69 releases the transition no back brake 67. The transition hand wheel 69 torque is then transmitted to the transition arm 57 to reposition it. Release of the transition hand wheel 69 allows the transition no back brake 67 to reset. The parallelogram caster linkage 27 maintains the skids 35 and 39 in a constant pitch attitude relative to the seat frame 10 as it moves the caster 25 and skids 35 and 39 in a forward and downward direction. The bogie 53 raises the spider wheel 51 up and forward to near the composite passenger and chair center of gravity during transition to the climbing position.

Figure 8E:
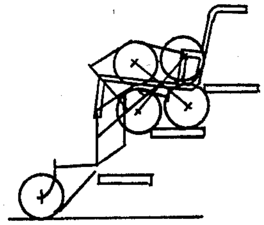
Figure 8F:
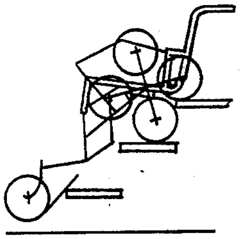
Figures 9A, 9B:
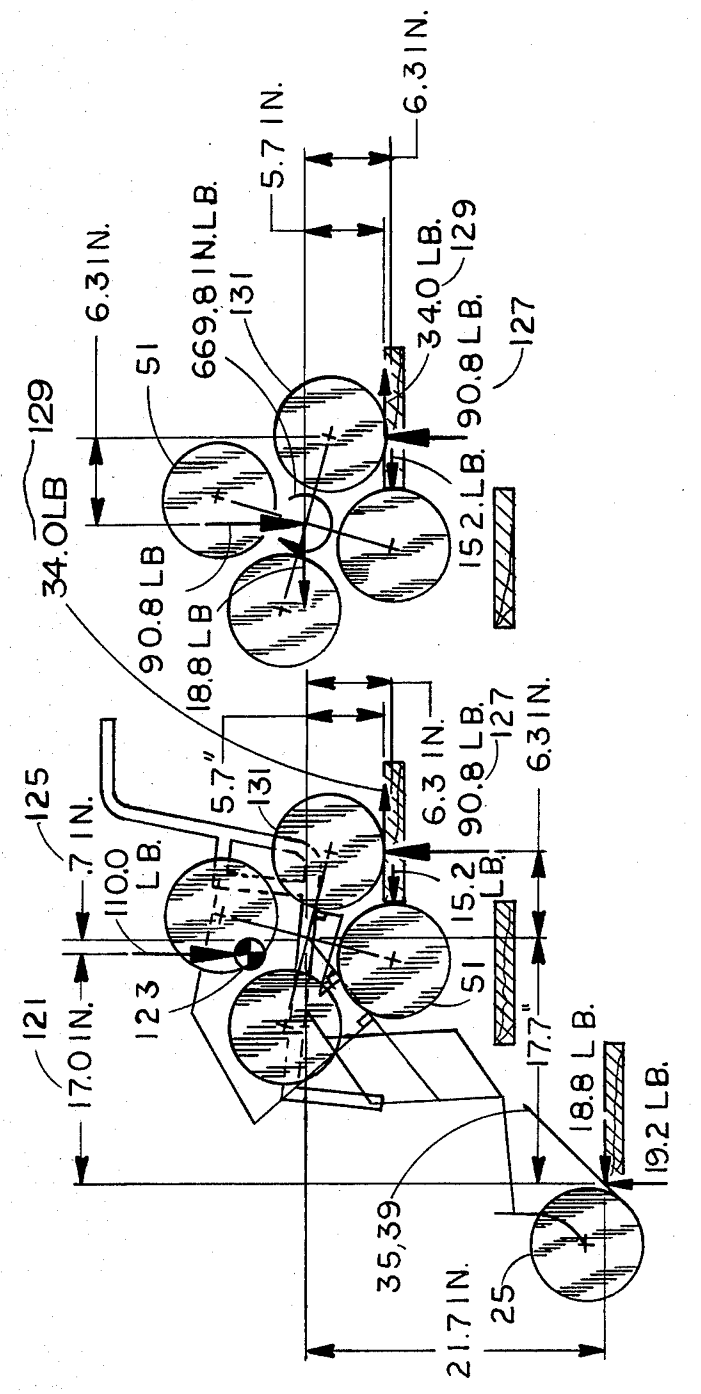
FIG. 9A is a schematic freebody diagram of typical forces acting on the wheel chair.
FIG. 9B is a schematic freebody diagram of typical forces acting on the spider wheel.

The passenger continues alternately climbing and repositioning the bogie 53 and caster 25 until the wheel chair is repositioned to match the stair angle as shown in FIG. 8E. As the passenger continues to climb, the skids 35 and 39 contact the first step and are dragged up the stairs as shown in FIG. 8F. Continued climbing is possible since skid reactions are minimized by moment arm changes made during transition. FIG. 9A and 9B show typical wheel chair climbing and spider wheel freebody diagrams with balanced forces and moments. The horizontal moment arm 121 of the reaction point on skids 35 or 39 or caster 25 about the center of gravity 123 has been increased and the horizontal moment arm 125 of the spider wheel 51 rotation axis about the center of gravity 123 has been reduced. The spider wheel 51 shown in FIG. 7A results in the moment generated by loads applied to the spider wheel 51 being grounded by the traction force component 129 of the supporting minor wheel 131. The resulting minor wheel 131 traction force 129 is reduced to a practical level by the mechanical drive advantage between the large diameter sprocket 83 and the small diameter sprocket 79. In the example shown in FIG. 9A and 9B, the 669.8 in.lb moment grounded through a chain drive ratio of 96 teeth on the large diameter sprocket 83 to 20 teeth on the small diameter sprocket 79 and a 4.1 in. minor wheel 75 radius results in a 34.0 lb traction load ((669.8 in.lb×20/96)/4.1 in.=34.0 lb.). This produces a vertical force 127 on the supporting minor wheel 131 which is high enough, 90.8 lb., and a horizontal force 129 component which is low enough, 34.0 lb., to require a feasible coefficient of friction (coefficient of friction required=34.0 lb./90.8 lb.=0.374) to avoid slipping of the supporting minor wheel 131 and to maintain stability. Selection of the spider wheel 51 mechanical advantage is the key to the climbing ability of the spider wheel 51. If the ratio of moment at the spider wheel 51 to moment at the minor wheel 131 is too small, an excessive horizontal force component 129 will be required at the supporting minor wheel 131 to develop the vertical climbing force required at the supporting minor wheel 131. For example, 20 teeth on both sprockets 79 and 83 and the same 669.8 in.lb moment would require in a traction force of 163.4 lb. for the same 4.1 in. minor wheel 75 radius ((669.8 in.lb.×20/20)/4.1 in.=163.4 lb.). The friction coefficient required would not be practical (friction coefficient required=163.4 lb./90.8 lb.=1.8). A friction coefficient requirement between the minor wheel and stairs greater than 0.5 or 0.6 may allow slipping and instability on the stairs.

Figure 11:
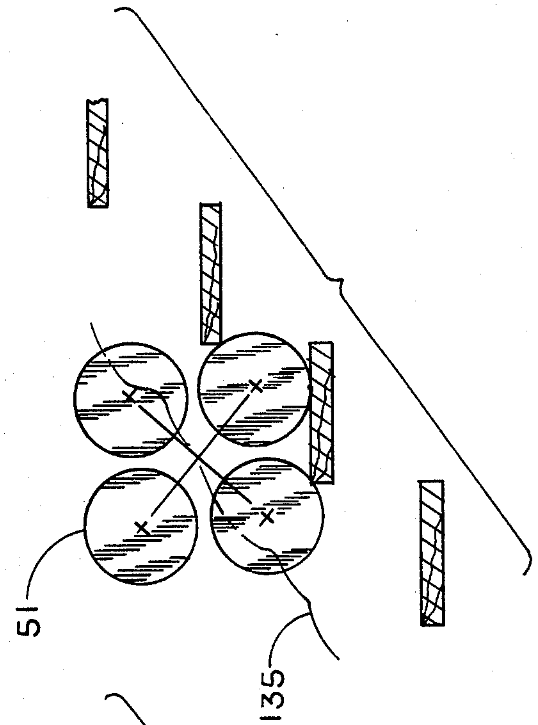
FIG. 11 is a schematic side elevation view of the path of the spider wheel traveling up or down typical stairs.
Figure 10:
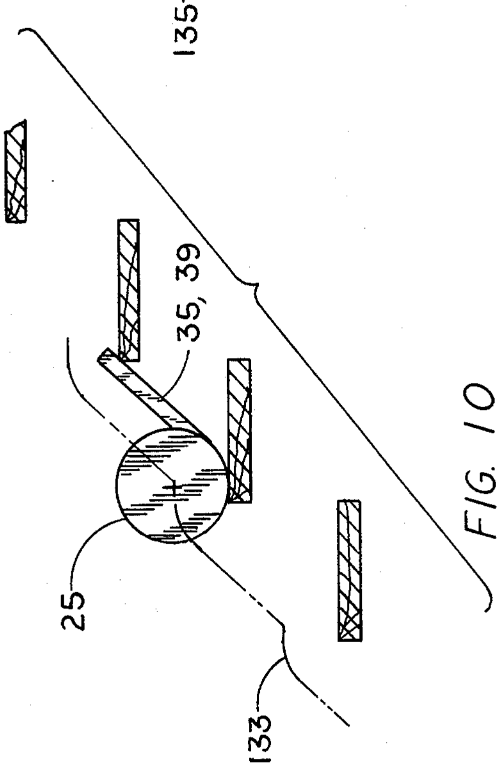
FIG. 10 is a schematic side elevation view of the path of the front caster and skid traveling up or down typical stairs.

The caster 25 with skid 35 and 39 follows a path 133 up the stairs which is essentially straight as shown in FIG. 10. The spider wheel 51 rotation axis follows path 135 which is also essentially straight as shown in FIG. 11. These straight paths permit the wheel chair frame 10 to maintain a pitch attitude which is nearly constant and is approximately level without repositioning the caster 25 and spider wheel 51 during climbing from step to step.

Figure 8G:
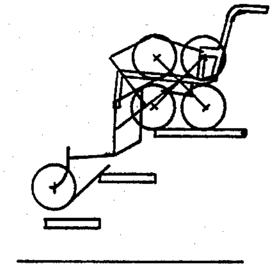
Figure 8H:
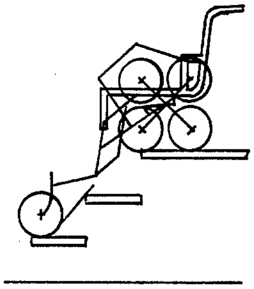
Figure 8I:
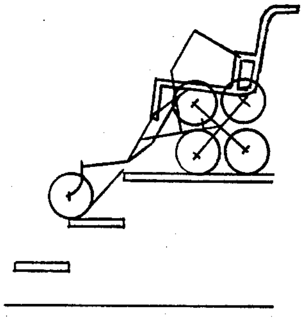
Figure 8J:
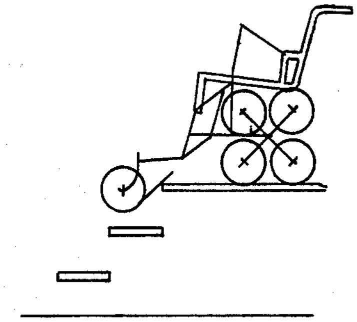
Figure 8K:
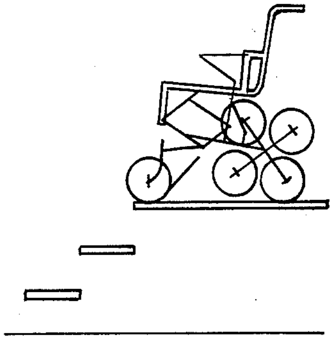

When the spider wheel 51 reaches the top of the stairs as shown in FIG. 8G, the wheel chair frame 10 begins to pitch backward as the caster 25 continues to climb and the spider wheel 51 remains level. The passenger must cease climbing and reposition the caster 25 and spider wheel 51 to relevel the seat frame 10 as shown in FIG. 8H. The passenger continues alternately climbing and repositioning until the caster 25 is on the top of the level of the stairs and the seat is in the level position as shown in FIG. 8I through FIG. 8K.

As the wheel chair is repositioned to the level position, the caster lock linkage unlocks the caster 25. Referring to FIGS. 5A and 5B, rotation of the lower caster arm 33 operates the lock linkage to disengage the pawl 41 from the slotted disk 45. Referring to FIG. 4, the spider wheel ratchet pawl 111 is activated by motion of the transition arm 57 and tension link 113 as the wheel chair moves to the level position. The ratchet pawl 111 engages the spider wheel 51 and lifts the forward minor wheel 75 off the ground as the bogie 53 is repositioned to the level position.

The passenger disengages the propulsion no back brake 95 by pulling the brake handle 103 upward to release the caliper brake 101 from the disk 97. Referring to FIG. 8K, the passenger is now free to propel the wheel chair in the conventional manner at the top of the stairs.

Figure 13:
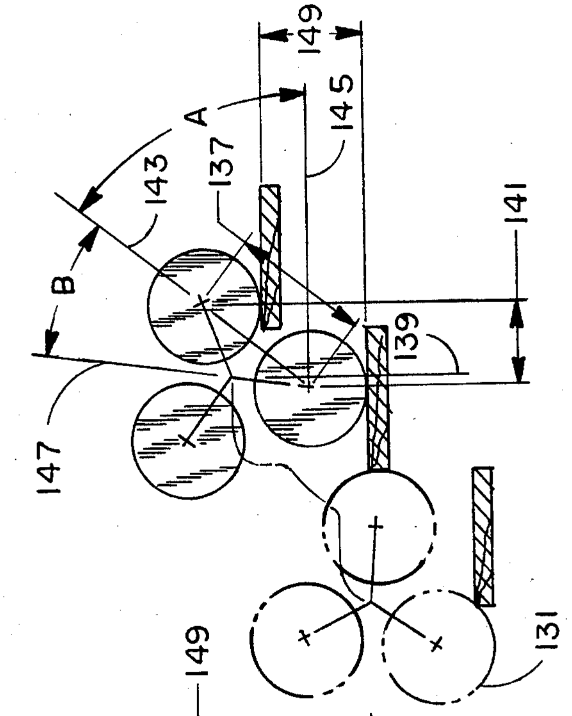
FIG. 13 is a schematic side elevation view of the moment arms and the path of a three minor wheel spider wheel descending stairs.
Figure 12:
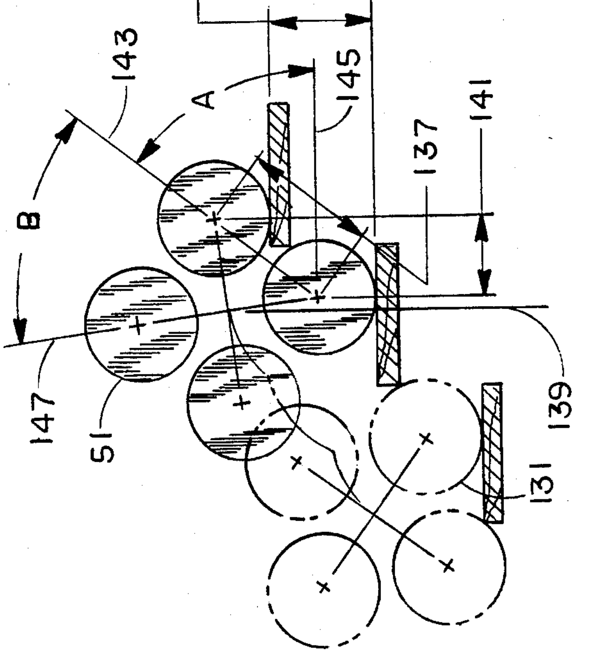
FIG. 12 is a schematic side elevation view illustrating the moment arms and the path of a four minor wheel spider wheel descending stairs.

The wheel chair descends the stairs in a similar manner to climbing. Again referring to FIG. 8K and describing only the left side, the passenger approaches the stairs facing down them. The passenger then backs away from the stairs to allow the caster 25 to reverse. The passenger then rotates the transition hand wheel 69 to pitch the seat frame 10 attitude backward to permit the caster lock linkage to lock the caster 25, to lower the forward minor wheel 75 and to deactivate the ratchet pawl 111. The passenger now verifies that the caster 25 is locked by attempting to turn the wheel chair or by visually observing the caster lock. The passenger then activates the propulsion no back 95 by pushing down on the brake handle 103. The passenger propels the wheel chair to approach the stairs and allows the caster wheels to rest near the edge. The passenger rotates the transition hand wheel 69 to reposition the caster 25 and spider wheel 51 until the wheel chair reaches the limit of rearward seat pitch attitude which is comfortable to the passenger. The passenger then alternately repositions the wheel chair and descends until the wheel chair is fully repositioned for descending as shown in FIG. 8G. As the forward minor wheel 75 rolls over the edge of the top of the stairs, the minor wheel 75 descends and the spider wheel 51 begins rotating in the same direction as the minor wheels 75. The configuration of the spiderwheel 51 must be compatable with stairs in both climbing and descending modes. Referring to FIG. 12, the distance 137 between minor wheels must be long enough to permit stepping up during climbing. Then to insure that the supporting minor wheels 75 will rest on level step surfaces during descending, means is required to insure that one minor wheel 75 of the spider wheel 51 hugs a step riser, as shown in FIG. 12. Means to insure stepping of the spider wheel 51 down the stairs and to insure spider wheel 51 hugging of the riser is provided by controlling the horizontal position of the spider wheel rotation center 139 when the supporting loads are transferred from one minor wheel 75 to another as shown in FIG. 12. If the spider wheel 51 rotation axis is between the horizontal limits 141 of the two minor wheels 75 on the stairs as shown in FIG. 13, no moment at the rotation center of the spider wheel 51 is produced by the minor wheel 75 reactions. Without a moment at the spider wheel 51 rotation center, no spider wheel 51 rotation is available for stepping and no crowding force is available to maintain hugging of the spider wheel 51 against a step riser. If the spider wheel 51 rotation axis is not between the horizontal limits 141 of the two minor wheels 75 resting on the steps as shown in FIG. 12, a moment is produced at the spider wheel 51 rotation axis. The moment then causes the spider wheel 51 to rotate as the spider wheel 51 descends to produce stepping or transferring of supporting loads from one minor wheel to the next. Also the moment produced by the vertical reaction of the minor wheel about the spider wheel rotation center is reacted through the spider wheel mechanical drive system and grounded by minor wheel 75 horizontal traction loads at the vertical surfaces of the next highest step riser. Thereby providing the spider wheel 51 the means to hug the stair riser. Means to insure that the horizontal position of the spider wheel rotation axis 139 is not located between the horizontal limits 141 of the supporting minor wheels axis when two minor wheels rest on two steps is insured by proper selection of the spider wheel 51 geometry. The sum of angle A and angle B as shown in FIG. 12 and FIG. 13 must be greater than 90 degrees for the spider wheel rotation axis 139 to be outside the horizontal position limits 141 of the two minor wheels resting on the two steps. Angle A is defined as the acute angle between a line 143 connecting the rotation axis of the two minor wheels resting on the two steps and a horizontal line 145 through the lower minor wheel 75. For equal radius minor wheels 75, angle A is defined by the distance 137 between the two minor wheel 75 axis and the step riser height 149. Angle B is the acute angle between a line 147 connecting the spider wheel 51 rotation axis and the lower minor wheel 75 rotation axis and a line 143 connecting the rotation axis of the two minor wheels 75 resting on the two steps. For radially symmetrical spider wheels, angle B is determined by the number of minor wheels 75 per spider wheel 51. For the stair geometry and minor wheel to minor wheel distances shown in FIG. 12 and FIG. 13, selection of a minumum of four minor wheels per spider wheel insures that the spider wheel will step down the stairs. Failure of the spider wheel to rotate the supporting loads from one minor wheel to the next during descending may result in an unstably positioned supporting minor wheel 131 as shown in FIG. 13. Referring to FIGS. 8F through 8A, continued spider wheel 51 rotation lifts the aft minor wheel 75 off the top step and lowers the next minor wheel 75 to the next lower step. The wheel chair continues down the steps and is repositioned back to the conventional level position at the bottom of the stairs. As the wheel chair is repositioned to the level position, the ratchet pawl 111 is reactivated and the spider wheel 51 is rotated against it. The spider wheel 51 is then restrained with the forward minor wheel 75 lifted off the ground as shown in FIG. 2. The passenger lowers the brake handle 103 and the wheel chair is ready for conventional operation at the bottom of the stairs.

The wheel chair may be repositioned to recline for the comfort and pleasure of the passenger by simply repositioning the spider wheels 51 and 52 and caster wheels 25 and 26 by rotating the transition hand wheels 69 and 70 as is done for transition to the stair climbing position. The wheel chair may also be repositioned for negotiation of steep slopes by rotating the transition hand wheels 69 and 70 as required to level the seat frame 10 with the casters 25 and 26 and the spider wheels 51 and 52 resting on a sloped surface.

A powered version may be provided by replacing or supplementing the hand wheels with electric motors with suitable controls and batteries or other suitable engines and power sources.

While the above description contains many specifities, these should not be construed as limitations on the scope of the invention, but rather as an exemplification of one preferred embodiment thereof. Many variations are possible for, example a motorized invalid chair, an appliance dolly version, a stair climbing robot, or life support system carrier. Accordingly, the scope of the invention should not be determined by the embodiment illustrated, but by the appended claims and their legal equivalents.

What is claimed is:

1. A self propelled vehicle adaptable to climbing stairs comprising: a cargo supporting frame, a pair of symmetrical rear suspension frames with a spider wheel rotatably attached to each, and a pair of symmetrical forward suspension frames with a sloped skid rigidly attached; with the rear suspension frames attached to the cargo supporting frame by a plurality of arms with ends rotatably attached to the cargo frame and the rear suspension frames, with the forward suspension frames attached to the cargo frame by a plurality of arms with ends rotatably attached to the cargo frame and the forward suspension frames; with rear frames and forward suspension frames containing a common attachment arm causing said frames to move in sequence with each other for respositioning the spider wheels in a forward and upward direction and skids in a forward and downward direction for traversing stairs with supporting loads carried primarily by the spider wheels.

2. Vehicle in claim 1 with caster wheels attached to the forward suspension frames.

3. Vehicle in claim 2 with mechanical means for locking the caster wheels, said means comprising a slider rod attached to the frame which is forced by a spring into a hole in a disk which is rigidly attached to the caster wheels, when the rear and forward support frames are in the position for traversing stairs and the caster wheels swivel to the backing position by backing the vehicle and with mechanical means for unlocking the casters when the rear and forward suspension frames are in the position for traversing level surfaces, said means comprising a lever and series linkage which lift the sliding rod out of the hole in the disk.

4. Vehicle in claim 1 with an arm for each locking spider wheel with only one minor wheel able to contact level surface per side when said vehicle is being repositioned for level operation and means for mechanically disengaging said aim for each locking spider wheel when vehicle is being positioned for stair traversing.

5. Vehicle in claim 1 with seat and other accommodations for a passenger.

6. Invalid vehicle in claim 5 with means for reclining seat back to provide occupant comfort.

7. Vehicle in claim 1 with means for transmitting manual or motor power to spider wheels.

8. Vehicle in claim 7 with means for preventing back driving of spider wheel by vehicle and cargo weight.

9. Vehicle in claim 1 with means for transmitting manual or motor power for repositioning the spider wheels.

10. Vehicle in claim 3 with means for preventing back driving of vehicle transition inputs.

11. Vehicle in claim 1 with means for folding to reduce said vehicle size for transporting or storing.

* * * * *